(12) United States Patent
Eckert et al.

(10) Patent No.: US 7,196,431 B2
(45) Date of Patent: Mar. 27, 2007

(54) DEVICE FOR PROMPTING A CONTROLLER

(75) Inventors: Gerhard Eckert, Dienheim (DE);
Walter Huber, Darmstadt (DE);
Gerhard Nagel, Gaertringen (DE);
Hans-Peter Schoener,
Modautal-Brandau (DE)

(73) Assignee: DaimlerChrysler AG, Stuttgart (DE)

( * ) Notice: Subject to any disclaimer, the term of this patent is extended or adjusted under 35 U.S.C. 154(b) by 480 days.

(21) Appl. No.: 10/882,678

(22) Filed: Jul. 2, 2004

(65) Prior Publication Data

US 2005/0023898 A1    Feb. 3, 2005

(30) Foreign Application Priority Data

Jul. 5, 2003    (DE) ................. 103 30 451

(51) Int. Cl.
*B60L 1/00*    (2006.01)
(52) U.S. Cl. ........................ 307/9.1; 307/10.1
(58) Field of Classification Search .......... 307/9.1, 307/10.1, 10.8
See application file for complete search history.

(56) References Cited

U.S. PATENT DOCUMENTS 6,548,996 B2 *    4/2003    Yi ................... 323/349

FOREIGN PATENT DOCUMENTS

| DE | 196 11 945 C1 | 3/1996 |
| DE | 197 15 880 C1 | 4/1997 |
| DE | 199 41 699 A1 | 9/1999 |
| EP | 0 829 786 A2 | 8/1997 |
| WO | WO 98/20609 | 5/1998 |

* cited by examiner

*Primary Examiner*—Robert L. Deberadinis
(74) *Attorney, Agent, or Firm*—Crowell & Moring LLP

(57) ABSTRACT

A device for prompting a controller in a vehicle to switch the controller from a normal operating state into an idle state includes a prompting device which switches a power supply through to the controller when activated to bring it into the normal operating state. The prompting device is connected in series to a first condenser and a resistor between power supply lines. A central tap between the first condenser and the resistor is connected directly or indirectly with the control input of a first transistor. An output of the first transistor is connected directly or indirectly with a control input of a second transistor that switches the supply current for the controller to be prompted. A connection line led back from the second transistor to the node between central tap and control input of the first transistor.

12 Claims, 1 Drawing Sheet

DEVICE FOR PROMPTING A CONTROLLER

This application claims the priority of German patent application 103 30 451.7, filed 5 Jul. 2003, the disclosure of which is expressly incorporated by reference herein.

The invention concerns a device for prompting a controller in a means of transportation having a power supply circuit, and in particular, to a device that prompts the controller to bring the power supply circuit from a resting state into a normal operating state. A prompting apparatus which is actuatable to connect the power supply through to transfer the controller into the normal operating state, is connected in series to an impulse generator circuit between the power supply leads, $U_{batt}$ or clamp 30 and ground.

In means of transportation, especially motor vehicles and aircraft, data bus systems are brought into operation by numerous individual control units. To diminish power consumption, the data bus as well as the controller can be entirely or only partially transferred into certain states in which controller operates under full power consumption in the normal operating state or in an idle state in which power consumption is reduced.

With means of transportation, network connection systems of this type (for example a so-called CAN bus in accordance with ISO 11519 or ISO 11898) are used to control motor functions or comfort functions in the motor vehicle interior. In recent years, a further specialization in these data bus systems has taken place so that further data buses for brake-by-wire systems or for telecommunication (such as, for example, D2B or MOST data buses) are used. Due to the high degree of network connection, there now exists the problem that the onboard network is under load when the means of transportation is parked, or when only few control functions (or none at all) are necessary. In order to diminish the power consumption in the resting state, the controllers are shut off after a certain time. As a result, however, it is necessary for the system, for example, to be able to receive a signal from a transponder for unlocking a door or the like. For this, it must be possible to prompt the individual controllers through the transponder or also other operating switches or signals from the idle state.

German patent document DE 197 15 880 C1 discloses a system with data bus network connected controllers. An individual controller is provided as a master controller, and is outfitted with a standby operating function with prompt readiness, and is constantly active. In the idle state of the motor vehicle, the master controller is in a standby state, while the remaining controllers are shut off. If the master controller receives a prompting signal, then it prompts the remaining controllers through a control line so that these are once again supplied with power and are ready for use in their normal function.

European patent document EP 0 829 786 A2 relates to a method for controlling the electrical supply of a number of control devices which communicate via a data link. After sending a first defined data command, at least one of the control devices is changed from a quiescent current requirement state into a normal requirement state.

German patent document DE 199 41 699 A1 discloses a semiconductor fuse for electrical load elements, in which a semiconductor switch is disposed between the battery serving as a current or voltage source and the load. Parallel to the semiconductor switch a short circuit-proof bypass with an integrated wakeup circuit is provided, which cooperates with the semiconductor switch.

International patent document WO 98/20609 discloses a digital wake-up timer for an electrical device, for example a telephone.

German patent document DE 196 11 945 C1 discloses a system in which control devices that are in an operating state, can quickly revert to a normal operating state. For this purpose in front of each control device and in front of its bus protocol module a semi-conductor circuit is connected, which can be supplied from a superordinate potential and can be awakened by means of a control input from a resting/sleep mode. The wake-up operation occurs via a control signal, whereupon the aforementioned semi-conductor circuit is switched into power supply mode.

With these known systems, at least one controller must always remain turned on which then can prompt the remaining controllers when needed. In an idle state in which even the voltage regulator of the last controller is shut off, there exists the problem that the controllers can no longer be prompted since the switches for prompting and the logic circuits which are necessary for supplying the operating voltage for the controller are not supplied with current and are therefore not capable of functioning. (A dead operating switch cannot connect the power supply for the control unit through.) For example, during prompting by a transponder, a logic circuit must also be supplied with power. The power, however, is not available in the idle state since the voltage supply is shut off and the switch or available logic circuits are jointly supplied through the operating voltage of the respective controller.

One object of the present invention is to provide an improved device for prompting a controller, such that individual controllers can be brought out of an idle state (in which the voltage supply of the controllers is shut off) into the normal operating state again, without a master controller having to remain ready to operate in order to furnish the electric energy for the prompting process.

This and other objects and advantages are achieved by the apparatus according to the invention, in which the impulse generating circuit has a central tap that is connected directly or indirectly with the control input of a first transistor. The first transistor is connected directly or indirectly with a control input of a second transistor, which turns on the supply power for the control unit to be prompted. A connection line to nodes in the conductor between the central tap and the control input of the first transistor is led back from the second transistor for self-holding of the through connection state. Preferably the impulse generator circuit has a condenser and a resistor connected in series for this purpose.

In accordance with the invention, the prompting device, especially an operating switch-push button or a switch actuatable by an electronic circuit, has an impulse generator circuit from which the initial impulse or the energy for the prompting process and for the logical variation of the prompt query (for example reloading of a condenser) originates. The impulse generator circuit can have a condenser for this purpose, from which the energy for the prompt impulse arises. As a consequence, the controller allocated to the prompting device can be shut off, as it need not remain in operation for energy supply for the prompting device.

In accordance with the invention, it is known that a controller can be activated through a transistor circuit, whereby in connection with a corresponding design with low loss building blocks, only the actuating energy must be made available at the control input of the transistor circuit.

The invention furnishes an especially low-loss device for prompting the controllers, since only a short actuation impulse is furnished by reloading a first condenser so that a first transistor of the transistor circuit is briefly actuated and the second output transistor is connected through to provide the controller with power. The decisive advantage is achieved in that a connection line to the conductor between central tap and control input of the first transistor is led back from the second transistor. If thus the second transistor is once connected through, then the controller is thereby supplied with power, such that the positive supply voltage minus the voltage drop in the transistor semiconductor lies on the energy-conducting clamp of the second transistor. This positive supply voltage is fed back through the connection lead before the control input of the first transistor, so that the control input of the first transistor lies on positive potential and therewith continues to maintain the second transistor in a conducting state. As a result, the second transistor can be actuated using a minimal actuating impulse through the first condenser and the second transistor then remains in the conducting state until the control input of the first transistor is brought to the ground.

The circuit of the invention makes it possible to prompt a controller with minimal energy consumption in the mA region. For the further through connection of the controller, the necessary actuation energy for the first transistor is taken from energy supply line of the controller at the second transistor. If the operating switch-push button is closed and the prompting circuit is "active," even before the second transistor becomes conductive, some mA current flows from the power supply unit into the circuit. It is essential that the low power consumption is applied in the idle state if no push button is actuated. This idle current is still only conditioned by the leakage current of the two transistors and through the passive self-holding.

A resistor is provided parallel to the first condenser through which the first condenser can discharge following the actuation process. As a consequence, the device for prompting the controller following the reloading process of the first condenser is immediately ready for use again. The energy consumption of the device for prompting results from the reloading energy of the first condenser and the parallel leakage current through the discharge resistor parallel to the first condenser which primarily results when the operating switch is in the closed position. The loss of energy through the resistor parallel to the first condenser can be minimized in that this resistor is used as high-resistance as possible.

A central tap is provided between the first condenser and the resistor connected thereto in series between the power supply lines. A second condenser is preferably connected between this central tap and the control input of the first transistor. This second condenser acts as a direct current block and prevents a direct current from flowing on toward the control input of the transistor through the first condenser outside of the short actuation impulse, so that an especially low energy consumption is made possible. Alternatively a special diode could also be used.

Between the second condenser and the control input, a connection lead is preferably lead back from the second transistor and in addition, a shut off output of the controller is electrically coupled to shut off the control input of the first transistor. Here the controller controls the shut off level over the switching limit of the control input on the first transistor, so that the voltage potential can, for example, be the zero level. A filter (for example, a lowpass filter) can also be arranged between the condenser and the control input. This prevents electromagnetic compatibility disturbances [ECD] from being coupled into the actuation line of the first transistor. Furthermore, the lowpass filter also delays the increasing flank of the switch on impulse on the first condenser. Preferably a resistor is coupled in between the first transistor and the control input of the second transistor that belongs to the voltage divider consisting of two resistors which apply the potential at the control input of the second transistor to the necessary operating point.

In particular controllers in the motor vehicle interior (for example, comfort controllers for seat, mirror and/or telematic functions) can be rapidly and locally prompted with the present invention, without the entire data bus having to be started up. This is possible because the device for prompting these control devices requires an extremely low energy expenditure which was not possible with traditional circuits whose consumption is an order of magnitude higher, since the actuation output was also necessary following through connection of the second transistor.

In accordance with the invention, a push button is used as an operating switch which applies the voltage supply, but for a short time, on the first condenser to charge the latter. Since with a condenser, voltage is the energy-bearing magnitude, the voltage cannot jump in connection with the condenser. As a result, the voltage impulse is applied on the resistor lying in series on the condenser which is once again connected with the control input of the first transistor. With the prompting device of the invention, this very short voltage impulse suffices to connect the second output transistor through. If push buttons are used as operating switches, no current will flow in the idle state, and high leakage currents will not occur through the second condenser in front of the first transistor, even with a defective operating switch since this second condenser functions as a direct current block.

For controllers in the comfort region, it is often not necessary to wait for data bus information when the ignition of the means of transportation is shut off. The prompting commands that are triggered by activation of the operating switches generate a short voltage impulse through which the controller is supplied with power. By activating an operating element, the first condenser constructed as low-loss storage condenser is charged. This voltage impulse generated in the first condenser actuates a self-holding circuit in the first transistor that is provided by the lead-back connection line, and the two transistors remain in the conducting state until the shut off signal arrives from the controller. In the event of an error (for example catching of the operating switch), the controller can be switched voltage-free. The idle current requirements of the circuit lies in the range of a few nanoamperes.

The device of the invention is preferably connected between the terminal 30 in a motor vehicle (that is, the ignition-on signal or the battery voltage $U_{Batt}$) and the zero potential on the motor vehicle chassis. The electric circuit of the device for prompting a controller is constructed such that with a defect in an operating switch, as low a direct current as possible flows from terminal 30. Condensers are provided in the circuit as direct current blocks for this purpose, which indeed let through the short switch on impulse, but block a longer lasting direct current flow from terminal 30 to the ground. In contrast to existing systems in which the controllers also remain in a basic readiness to receive bus signals even when the ignition is shut off, with the device of the invention, the controller can be shut off and be locally prompted as needed. The device of the invention consists of an impulse former stage consisting of the first condenser and the resistor connected to it in series, and of an actuation stage with self-holding circuit consisting of the two transistors and the feedback over the connection line.

The prompting device is preferably constructed as a so-called wired Or-circuit in which one or more operating switches are allocated to the controller to be prompted and connected parallel to one another. This wired Or-circuit has the advantage that the controller is prompted by activation of one of the operating switches connected parallel, so that it can then be determined, through a line passed from the operating switch to the controller, which particular operating switch was activated.

The operating switches connected together through the wired Or-circuit are connected to one another parallel, and a diode is respectively connected in the line leading to the ground. A potential tap that is lead to the controller is respectively provided between the operating switch and the diode. Due to the connection line running from the potential tap to the controller, it can be determined in the controller which operating switch was activated. Basically, however, each activation of any desired operating prompts the controller. The device for prompting the controllers is allocated to a respective individual controller. Up to sixty controllers are used on the data bus inside the means of transportation, which can be prompted in various ways. With the prompting device of the invention, preferably comfort controllers can be prompted through the allocated operating switches without the entire data bus having to be started up. It is immaterial for prompting the controller which of the operating elements from the group of operating switches allocated to the controller is activated.

If an operating switch is activated, the battery voltage is connected through to the first condenser, so that the transistor stage switches the supply voltage to the controller. The additional line from the operating switch to the controller then indicates which operating switch was activated. In this way, the controller can execute the function allocated to the operating switch after start-up, for example, adjusting the seat.

In another embodiment of the invention, the prompting device is divided into two groups of operating switches which both prompt the same controller, so that each of the operating switches of one group is electrically connected with a respective further controller. On the other hand, it can also be provided that the activation of an operating switch prompts several controllers, whereby the functions of the two groups of operating switches are fed to a first controller and then subsequently the function of the second group to be conducted is transmitted through the started up data bus to a further controller that was prompted when an operating switch was activated with the first controller. The operating elements of the first group then trigger function A, for example, that is programmed in the first controller. The operating elements of the second group then trigger functions B which are programmed and controlled in the second controller. In the refinement, the signals of the operating switch of both groups are processed in the first controller. Despite this, each activation of an operating switch prompts the first and second controllers simultaneously. The first controller then transfers the calculated data via the data bus to the second controller, which then evaluates the transmitted signals.

Other objects, advantages and novel features of the present invention will become apparent from the following detailed description of the invention when considered in conjunction with the accompanying drawings.

DETAILED DESCRIPTION OF THE DRAWINGS

Figure 1:
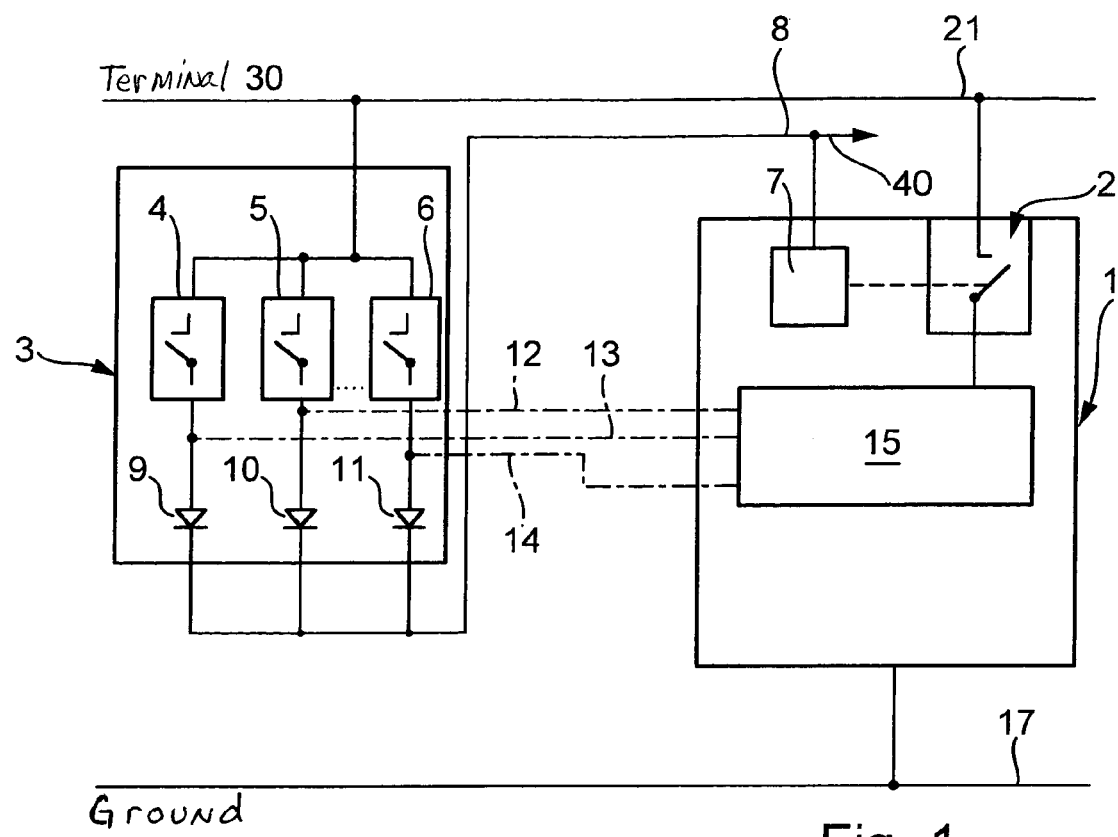
FIG. 1 is a schematic circuit diagram of the device for prompting a controller in accordance with the present invention.

The device for prompting a controller 1 in a means of transportation is outfitted with a power supply switch 2 through which the controller 1 can be transferred from an idle state into a normal operating state. A prompting device 3 has several operating switches 4–6 connected parallel to one another, which upon activation connect the power supply switch 2 of the controller 1 through. The device has a control circuit 7 which is electrically connected with the operating switches 4–6 through a connection line 8. The control circuit 7 controls the power supply switch 2 so that the controller 1 is supplied in the normal operating state with energy from the power supply lines, for example over terminal 30 and the ground line.

The parallel connected operating switches 4–6 have on their side in the connection line 8 facing the control circuit 7 respectively a diode 9–11. In addition an information line 12–14 is electrically connected to the microcomputer 15 of the controller 1 from each connection line 8 of the individual operating circuits 4–6. The microcomputer 15 in this way receives information indicating which of the respective operating switches 4–6 has been activated, so that the microcomputer 15 can execute the corresponding program. The information lines 12–14 can respectively communicate the potential level between diodes 9–11 and the associated operating switches 4–6 to the controller 1, where the voltage value is digitized. In this manner, it can be established in the microcomputer 15, based on the applying potential, whether an operating switch 4–6 was activated. The diodes 9–11 here respectively have the function that when the operating switches 4–6 are open, no current flows from the actuation circuit 7 through the connection line 8 and the information lines 12–14 to the microcomputer 15.

The device for prompting the controller 1, especially a comfort controller, functions as follows: If, for example, a motor vehicle has been parked for several days, then all systems are in the idle state. It the motor vehicle door is opened, then a door control device is prompted through an allocated transistor switch, which starts up the entire network.

If now the data bus is transferred back into the idle state following a long disuse, subsequently individual comfort controllers can also be individually locally prompted through an allocated operating switch using the device of the invention. If the controller 1 is a seat controller, the activation of the operating switch 4 causes the controller 1 to be locally prompted out of the idle state. After the microcomputer 15 is started up, it can be established through the allocated information line 13 that, for example, a seat adjusting key for horizontal relocation of the seat was activated. The microcomputer 15 for this reason executes the function of horizontal relocation of the motor vehicle seat immediately without having to prompt the entire data bus system with all controllers depending thereupon. After a certain period of time, the controller 1 generates a shut off signal through its microcomputer 15, through which the controller 1 places itself into the idle state. The operating switches 4–6 can then once again be reactivated through which the seat controller assumes its function. The operating switches 4–6 can also be replaced by relays or remotely operable transistor switches so that even opening the motor vehicle doors or opening the trunk or the motor hood can be conducted through such a device for prompting a controller and the allocated actuators.

In FIG. 1, an actuation circuit 7 of a further controller can be coupled through a line 40 so that through the operation of one of switches 4, 5, 6, one or more additional controllers beside controller 1 can be simultaneously prompted. Either all functions can be preprocessed in controller 1 through lines 12–14 be transmitted through a data bus (not shown) to the further controller, or separate information lines to the further controllers are provided. In this way, all controllers affected by an operating function can be simultaneously prompted through the information lines 12–14 or through the connection line 8 or 40, without a transfer having to take place through a data bus for this purpose. If merely individual comfort functions are commanded, for example telephoning over a mobile telephone, while the vehicle is in the idle state, only the affected controller 1 etc. is prompted.

The device for prompting a controller in accordance with the present invention enables switching on the second output transistor which switches the controller to the battery voltage (terminal 30). The operating switches 4–6 are preferably constructed as push buttons and are connected electrically with the actuator circuit 7 to prompt the controller 1. The information lines 12–14 serve to identify the activated operating switches 4, 5, 6 so that the desired function can be executed by the controller 1.

Figure 2:
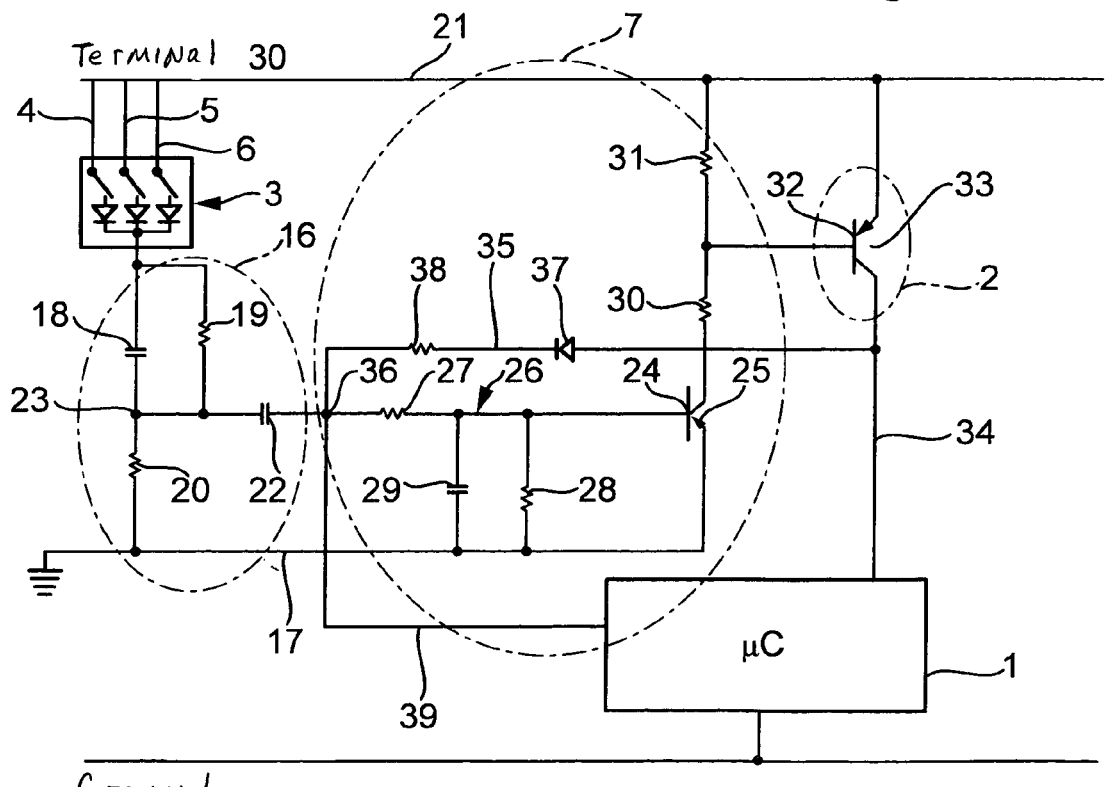
FIG. 2 shows a more detailed circuit diagram of the device of the invention.

In FIG. 2, the device for prompting the controller 1 is represented in greater detail. The operating switches 4, 5 and 6 of the prompting device 3 are electrically connected with an impulse former switch 16 and an actuation switch 7 with self-holding.

The impulse former stage 16 has a first condenser 18 which can discharge over the parallel connected resistor 19. Between the power supply line 21 with positive potential (which for example corresponds to the terminal 30 voltage with the ignition in signal) and the power supply line 17 with the ground potential, an additional resistor 20 is connected in series with the a prompting device 3 and the first condenser 18. A second condenser 22 is provided on the output side on the impulse former step 16 as a direct current block. The actuation switch 7 has a lowpass filter 26 (which consists of the resistor 27 and a condenser 29) between the first condenser 18 (the nodal point 23) and the control input 24 of a first transistor 25. The lowpass filter 26 filters out high frequency noise signals at the input of the first transistor 25. An additional resistor 28 is provided in the circuit, which secures shutting off of the transistor 25 when a shut off signal (for example a LOW signal) is applied on the line.

The first transistor 25 controls the control input 32 of a second transistor 33 through a voltage divider 30, 31. This second transistor 33 can connect through the positive potential of the power supply line 21 through the power supply line 34 to the controller 1, so that the latter can switch into the normal operating state. A voltage regulator (not shown) can be provided inside the controller 1 or before the voltage supply line 21 to furnish the voltage correspondingly for the controller or the individual components. A connection line 35 loops the voltage potential of the second transistor 33 back to a node 36 between the central tap 23 and the control terminal 24 of the first transistor 25. A diode 37 prevents a flow of current over the connection line 35 in the false direction and a resistor 38 reduces the current flow.

A self-holding circuit is provided through the connection lead 35. As soon as the second transistor 33 is turned on, a positive potential is applied through the connection lead 35 to the control terminal 24 of the first transistor 25, so that the first transistor 25 and therewith also the second transistor 33 automatically remain turned on. In addition, the shut off line 39 from the microcomputer 1 is coupled to the node 36, so that the microcomputer 1 can supply the control terminal 24 of the first transistor 25 with a shut off potential, and the second transistor 33 is shut off. The shut off line 39 is actuated when the controller 1 is automatically transferred to the idle state.

The circuit represented in FIG. 2 functions as follows: When the operating switch 4 is activated, a positive potential is applied to the condenser 18, which begins to charge. In this way, a positive potential of the positive supply voltage 21 is applied in a sudden burst to the central tap 23, but diminishes over time, through charging the condenser 18. This impulse-like switch on potential is applied to the control input 24 of the first transistor 25 through the condenser 22 functioning as direct current block. In this way, the first transistor 25 turns on and therewith places the control input of the second transistor 33 on positive potential so that the controller with positive supply voltage is supplied from the power supply line 21.

Resistor 19 causes condenser 18 to be discharged again following the prompting process if the operating switch 4 is subsequently opened. The condenser 22 serves to allow no current flow to the transistor 25 or into the controller 1 in the event of a defective operating switch 4–6. The lowpass filter 26 can also filter out signal fluctuations in addition to electromagnetic compatibility disturbances, which arise through a bouncing of the operating switch 4. A bipolar transistor can be provided as the first transistor 25. On the other hand, the transistor end stages can also be converted with transistors 25 and 33 in the MOSFET technique. The already described self-holding circuit arises through the feedback line 35. In this way, the transistor 33 remains in a conductive state up to the control input of the transistor 25 until a shut off potential is applied through the shut off line 39.

A bouncing or a renewed activation of an operating switch does not alter the state of the prompting circuit or the switching state of the transistor 33. The controller 1 now lying above the transistor 33 at the supply potential conducts the necessary functions, waits a certain time and then subsequently switches back into the idle state. A software function is provided on the controller 1 which, after taking care of the function commanded by the operating circuit 4, applies a shut off signal with zero level to line 39 after a dwell time, so that the controller is shut off. The resistor 28 applies the control input of the first transistor 25 to the ground line and guarantees blocking the first and second transistor 25, 33 until the next prompting of the controller 1 by activating one of switches 4–6.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for prompting a controller in a vehicle having a power supply circuit for the controller, to transfer the controller from an idle state into a normal operating state, said device comprising:

a prompting means actuatable for switching the power supply through to bring the controller into the normal operating state; wherein the prompting means is connected in series with an impulse generator stage, between power supply lines;

the impulse generator stage has a central tap which is connected directly or indirectly with the control input of a first transistor;

an output of the first transistor is connected directly or indirectly with a control input of a second transistor that connects the supply power with the controller; and a connection line from an output of the second transistor is fed back to a node in a conductor which connects the central tap and the control input of the first transistor, for self-holding of the through switching state of the second transistor.

2. The device according to claim 1, wherein the impulse generator stage comprises a first condenser and a resistor connected in series.

3. The device according to claim 2, wherein a second condenser is connected into the connection between central tap and control input of the first transistor.

4. The device according to claim 2, wherein a resistor is provided parallel to the first condenser through which the first condenser can discharge.

5. The device according to claim 1, wherein the prompting device has at least one operating switch allocated to the controller to be prompted and connected parallel.

6. The device according to claim 5, wherein the at least one parallel connected operating switch is connected together in a wired on circuit so that the activation of each of the operating switches leads to the prompting process of the controller.

7. The device according to claim 5, wherein each of the at least one parallel connected operating switch is connected through a diode with the ground line of the means of transport and with the first condenser.

8. The device according to claim 1, wherein:

the prompting device has two groups of operating switches which both prompt the same controller; and the operating switch of one group are electrically connected conductive with a respective further controller.

9. Apparatus for prompting a controller to change from an idle state to an active state, said apparatus comprising:

a first electronic switch having a control input and a first interruptible current path connected between a power supply source and a fixed potential;

a second electronic switch having a control input connected to a voltage at said first interruptible flow path, and having a second interruptible flow path connected between said power supply source and said controller;

an impulse generator;

an input switching device connected in series with said impulse generator, for interruptibly connecting said impulse generator to said power supply source;

a first connecting line which connects said control input of said first electronic switch directly or indirectly to a central top of said impulse generator; and a second connection line which connects said second current flow path directly or indirectly to a node in said first connecting line.

10. The device according to claim 9, wherein the impulse generator comprises a first condenser and a resistor connected in series.

11. The device according to claim 10, wherein a second condenser is connected into the connection between central tap and control input of the first transistor.

12. The device according to claim 11, wherein a resistor is provided parallel to the first condenser through which the first condenser can discharge.

* * * * *